United States Patent [19]

Bjerede et al.

[11] Patent Number: 5,398,139
[45] Date of Patent: Mar. 14, 1995

[54] DIGITAL AUDIO REPRODUCTION SYSTEM WITH IMPROVED NOISE SUPPRESSION

[76] Inventors: Bjoan Bjerede, 603 Bonair Way, La Jolla, Calif. 92037; William H. Firebaugh, 2213-A Via Mariposa E., Laguna Hills, Calif. 92653

[21] Appl. No.: 68,764

[22] Filed: Jun. 1, 1993

[51] Int. Cl.[6] .......................... G11B 5/09; G11B 5/035
[52] U.S. Cl. ........................................... 360/32; 360/65
[58] Field of Search ....................... 360/32, 39, 55, 65; 369/50, 44.29

[56] References Cited

U.S. PATENT DOCUMENTS

| | | | |
|---|---|---|---|
| 5,107,480 | 4/1992 | Naus | 369/50 |
| 5,210,732 | 5/1993 | Suenaga et al. | 369/44.29 |

Primary Examiner—Donald Hajec
Assistant Examiner—T. N. Forbus, Jr.

[57] ABSTRACT

A digital audio reproduction system for compact discs, digital audio tapes and other similar systems suppresses digital noise present in the frequency band immediately above the audio band. Digital preprocessing combined with narrow output filters result in significant noise suppression without adverse distortion of the desired audio signal. The digital preprocessor may be combined with digital oversampling filters into a single integrated circuit or microprocessor.

2 Claims, 3 Drawing Sheets

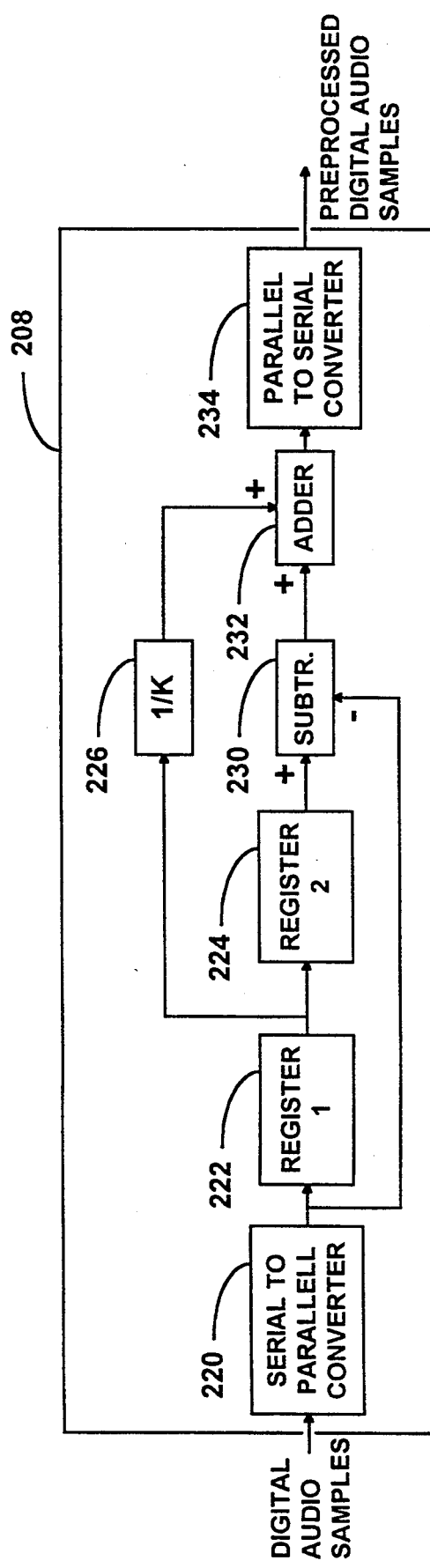
Figure 2
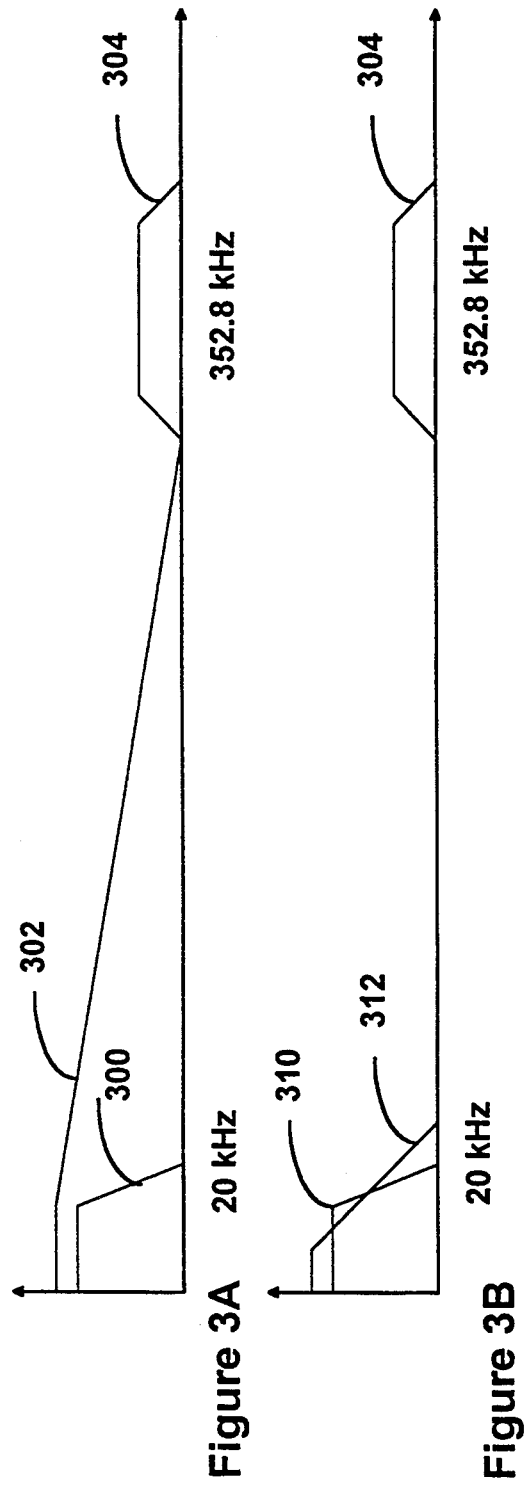
Figure 3A
Figure 3B

DIGITAL AUDIO REPRODUCTION SYSTEM WITH IMPROVED NOISE SUPPRESSION

BACKGROUND—FIELD OF INVENTION

This invention relates to equipment used for reproduction of digitized audio and in particular compact disc players, digital audio tape players or stereo equipment using any other form of digital storage media.

BACKGROUND—DESCRIPTION OF PRIOR ART

The introduction of digital reproduction systems based on compact discs and digital audio tapes has improved the sound quality of mass produced consumer stereo systems. Compact discs (CD) and digital audio tapes (DAT) store samples of audio as 16 bit words, corresponding to signal to noise ratios better than 96 dB. The sampling rates are 44.1 kHz and 48 kHz for CD and DAT, which in theory makes possible a frequency response from DC to 20 kHz using anti aliasing filters that suppress frequencies above half the sampling rate, 22.05 kHz and 24 kHz respectively. Digital sound reproduction systems therefore generally have lower distortion, better frequency response and less noise than competing analog reproduction systems such as vinyl records and audio tapes. When first introduced, the compact disc system was generally believed to provide virtually perfect sound quality. However it was soon discovered that the sound quality was degraded by the very sharp analog "brick wall" filters required to suppress aliased frequency components above 22.05 kHz (half the sampling rate), while passing the audio spectrum below 20 kHz. Such filters introduce significant phase distortion, resulting in poor transient response and degraded audio quality.

This problem was recognized by most major manufacturers of CD players early on and resulted in so called "over sampling" CD players, where the sampling rate is increased by digital processing. To overcome the problems caused by these very sharp "brick wall filters", virtually all compact disc player manufacturers use digital interpolation to increase the sampling rate of the digital samples. Typically interpolation rates of 8 times are used, resulting in so called "eight times over sampling CD players". The increased sampling rate makes it possible to use low pass filters with a more gradual amplitude response, with attendant improvements in the phase distortion. The digital samples from the digital playback source are processed by a digital interpolator, resulting in a sampling rate of 8×44.1 kHz=352.8 kHz. The aliased spectrum of the interpolated samples around 352.8 kHz extends down to 7.5*44.1 kHz=330.75 kHz, while the desired spectrum extends up to 20 kHz. The low pass filter now can be much wider with the stop band beginning at 330.75 kHz in stead of 22.05 kHz as was the case with the system shown in FIG. 1.

There is still a noticeable phase distortion even with eight times over sampling, so some high end players implement even higher over sampling rates such as 32 times and 64 times over sampling, sometimes using separate outboard processors to achieve the best possible sound within the limitations imposed by the technology. Other high end CD reproduction systems use elaborate constant phase filters, such as Bessel filters, to minimize phase distortion in the audio band, while suppressing frequency components above 308.7 kHz.

Another problem in the reproduction of digital audio is caused by digital noise products present in the frequency band immediately above the 20 kHz audio band. Such noise products are induced by coupling from digital processing circuitry, to the DAC's and associated circuitry, prior to the low pass filtering of the resulting output. They are not significantly suppressed by the wide filters used with oversampling CD and DAT players. Although these spectral components may not be audible by themselves, they generate audible intermodulation products, when applied to non-linear elements such as transistor amplifiers, headphones, speakers, etc.

In many cases digital reproduction systems based on compact discs and digital audio tapes are implemented in two or more separate enclosures. This makes it easier to isolate and suppress digital interference and provides increased flexibility. A typical implementation may contain the drive for the compact disc or digital audio tape in one enclosure, the digital interpolating and processing circuitry in a second enclosure and the DAC with the analog output circuitry in a third enclosure. Other partitions of these functions are also used. In some system the digital circuitry is implemented in integrated circuits, while in other systems the digital processing functions are implemented in microprocessors. The present invention can also be implemented in these various configurations. In summary, oversampling digital audio systems introduce unwanted phase and amplitude distortion and provide inadequate suppression of digital noise spectral components above 20 kHz.

OBJECTS AND ADVANTAGES

Accordingly, besides the objects and advantages of the oversampling digital audio systems described above, objects and advantages of the present invention are:
 (a) to suppress digital and other noise components that would otherwise be present in the frequency spectrum above the 20 kHz audio band.
 (b) to provide digital audio reproduction that does not distort the phase and amplitude of the reproduced audio signal.

DRAWING FIGURES

The features, objects, and advantages of the present invention will become more apparent from the detailed description set forth below when taken into conjunction with the drawings wherein:

FIG. 2 illustrates in a block diagram one embodiment of an amplitude and phase preprocessor circuit;

FIG. 3A illustrates, in a graph, the amplitude versus frequency spectrum of an oversampling digital-to-analog converter;

FIG. 3B illustrates, in a graph, the amplitude versus frequency spectrum of an oversampling digital-to-analog converter with improved noise suppression;

Figure 1A:
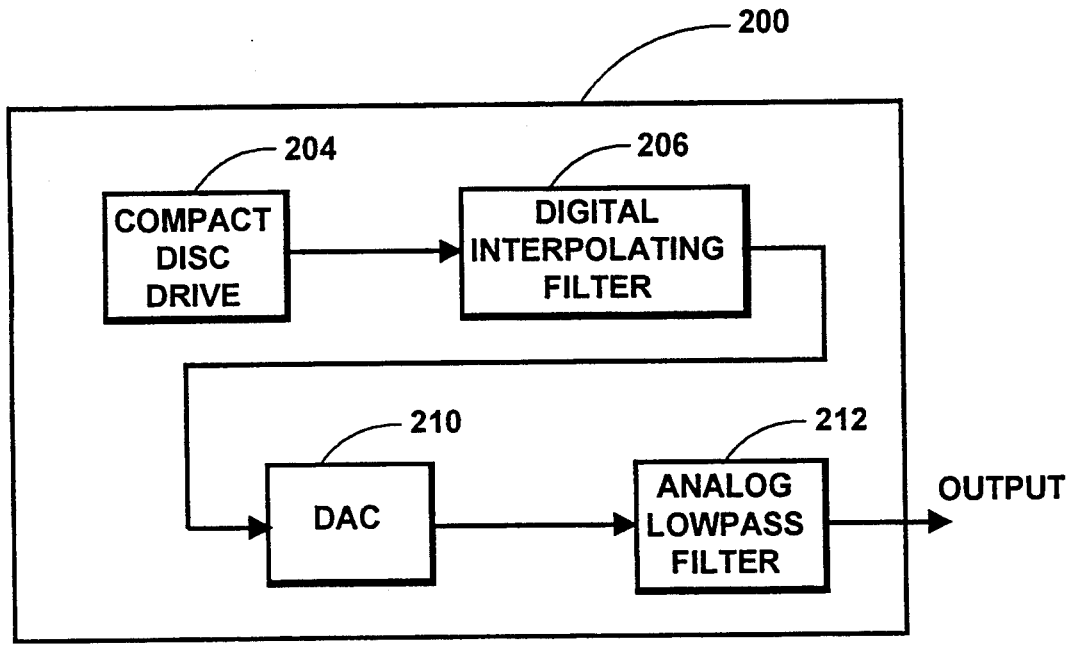
FIG. 1A illustrates in a block diagram one embodiment of a prior art compact disc player.

| Reference Numerals In Drawings | | | |
|---|---|---|---|
| 200 | block diagram of prior art compact disc player | 202 | block diagram of compact disc player with improved noise suppression |
| 204 | compact disk drive | 206 | digital interpolating filter |
| 208 | amplitude and phase preprocessor | 210 | digital to analog converter |
| 212 | analog low pass filter | 214 | narrow analog low pass filter |
| 220 | serial to parallel converter | 222 | register 1 |
| 224 | register 2 | 226 | multiplier |
| 230 | subtractor | 232 | adder |
| 234 | parallel to serial converter | 300 | audio spectrum |
| 302 | frequency response of prior art filter | 304 | aliased audio spectrum |
| 312 | frequency response of improved filter | 324 | frequency response of filtered audio spectrum |
| 330 | frequency response of amplitude and phase preprocessor | 332 | frequency response of corrected audio spectrum |
| 340 | frequency response of digital-to-analog converter with improved filtering | | |

DESCRIPTION—FIGS 1 TO 4

Prior art compact disc players and digital audio tape players typically utilize digital interpolation, also referred to as digital oversampling, to increase the sampling rate of the digital audio samples before they are converted to analog samples. It is well known that by increasing the sampling rate of the output samples the filtering of the analog output samples is simplified. The output filters must suppress the aliased spectrum around the output sampling frequency. By employing a high sampling rate, it is possible to use analog low pass filters with relatively wide bandwidth. These low pass filters have bandwidths that are many times wider than the bandwidth of the audio spectrum (approximately 20 kHz) and cause less amplitude and phase deviation in the audio band, while still providing adequate suppression of the aliased spectrum around the sampling frequency. Typically bandwidths between 50 kHz and 150 kHz are used for 8 times oversampling players.

The employment of digital oversampling to improve the frequency and phase response of compact disc players and digital audio tape players is well known in the art. However what is before unknown is the employment of digital amplitude and phase preprocessing to allow the use of analog low pass filters with narrow bandwidths. The use of output filters, with bandwidths of comparable to the audio bandwidth, is found to significantly reduce the effect of digital noise contained in the output signal of the digital to analog converters. Such filters suppress spectral components of the digital noise above the audio bandwidth. Discrete spectral components above the audio bandwidth are not audible by themselves, but they generate audible intermodulation products, when applied to non-linear elements such as transistor amplifiers, headphones, or speakers, etc. A digital preprocessing circuit compensates for the phase shift and amplitude roll off caused by the narrow output filters, resulting in an overall flat phase and amplitude response over the audio frequency band. Prior art compact disc players do not compensate for the phase and amplitude shift caused by narrow output filters.

A typical embodiment of a prior art compact disc player 200 is used as an example. Only one of the two stereo channels of the compact disc player is shown for simplicity. It contains a compact disc drive 204 that generates digital samples that are read from a compact disc. The samples correspond to an analog stereo signal, that has been recorded and sampled at a rate of 44100 samples per second. The samples are stored as 16 bit words on the compact disc. The digital interpolator 206 receives the digital samples and increases the sampling rate from 44.1 kHz to 8*44.1 or 352.8 kHz. The DAC 210 converts the digital samples into analog samples. An analog low pass filter 212 converts the sequence of analog output samples, having a staircase like appearance, to a continuous analog output signal.

Figure 1B:
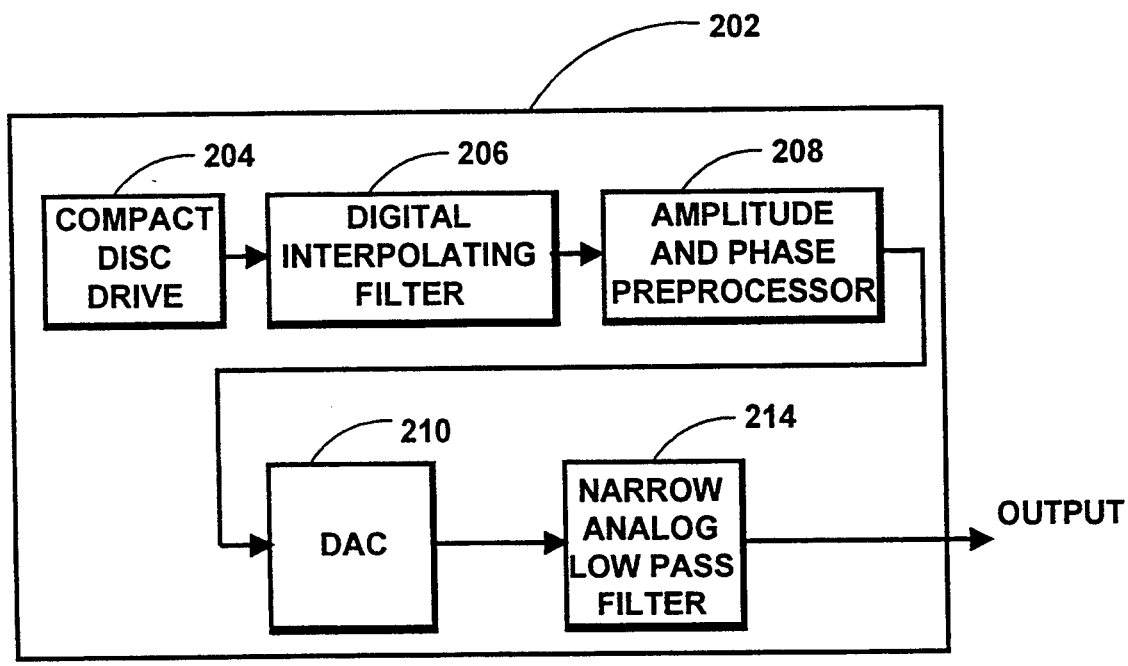
FIG. 1B illustrates in a block diagram one embodiment of a compact disc player, with improved noise suppression.

A typical embodiment of the present invention is illustrated in FIG. 1B. A compact disc player 202 is used as an example. Only one of the two stereo channels of the compact disc player is shown for simplicity. It contains a compact disc drive 204 that generates 16 bit digital samples that are read from a compact disc at a rate of 44.1 kHz per channel. The digital interpolator 206 receives the digital samples and increases the sampling rate to 352.8 kHz. The amplitude and phase preprocessor 208 preprocess the digital samples to compensate for phase and amplitude distortion introduced by a narrow analog lowpass filter 214. The digital to analog converter 210 converts the digital samples into analog samples. The narrow analog low pass filter 214 converts the sequence of analog output samples to a continuous analog output signal. Digital data is transferred between the compact disc drive 204, the digital interpolating filter, and the amplitude and phase preprocessor circuit as a serial digital data.

The amplitude and phase preprocessor is illustrated in FIG. 2. It contains a serial to parallel converter 220 that receives a serial data stream from the digital interpolator and converts it to parallel digital data. Two registers 222 and 224 are used to store the last two previous samples received by the serial to parallel converter 220. The subtractor 230, the adder 232 and the multiplier 226 combine to generate the output samples from the present and last two samples, in such a way that the amplitude response and phase shift of the output filters 212 are compensated. A parallel to serial converter 234 is used to convert the digital samples at the output of the adder 232 to a serial data stream, which contains the corrected digital samples, for subsequent transfer to the DAC 210. FIG. 3A illustrates the output spectrum of a prior art compact disc player. The audio spectrum 300 extends from 0 to 20 kHz. An aliased spectrum 304 extends ±20 kHz around the sampling frequency, which is 352.8 kHz for 8 times oversampling. The frequency response 302 of the low pass filter 212 is flat over the audio spectrum 300 and suppresses the aliased frequency components 304 around the sampling frequency. Since the aliased spectrum 304 is widely separated from the audio spectrum 300 a low pass filter 212, with fairly wide frequency response, can be used to suppress the aliased frequency components 304. However any undesired digital noise or interference immediately above 20 kHz will not be significantly attenuated by the low pass filter 212.

Figure 4A:
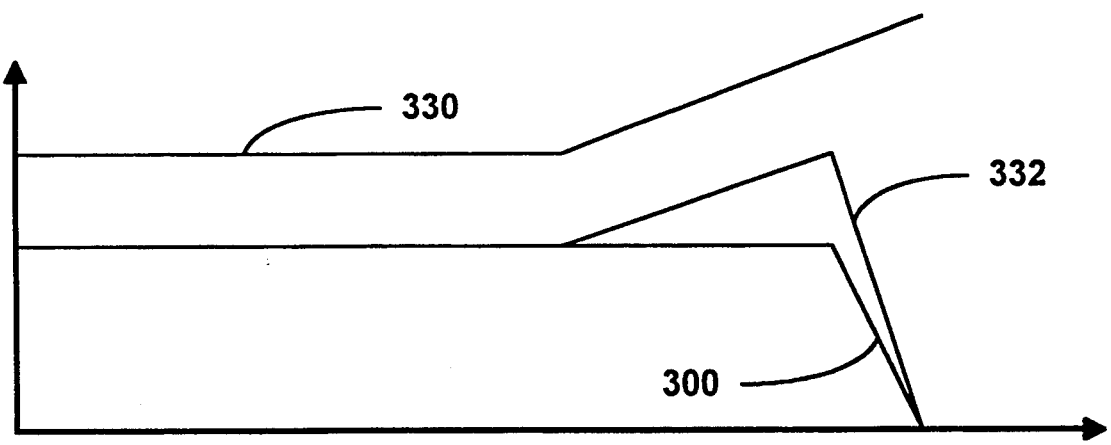
FIG. 4A illustrates, in a graph, the amplitude versus frequency spectrum of an amplitude and phase preprocessor circuit.
Figure 4B:
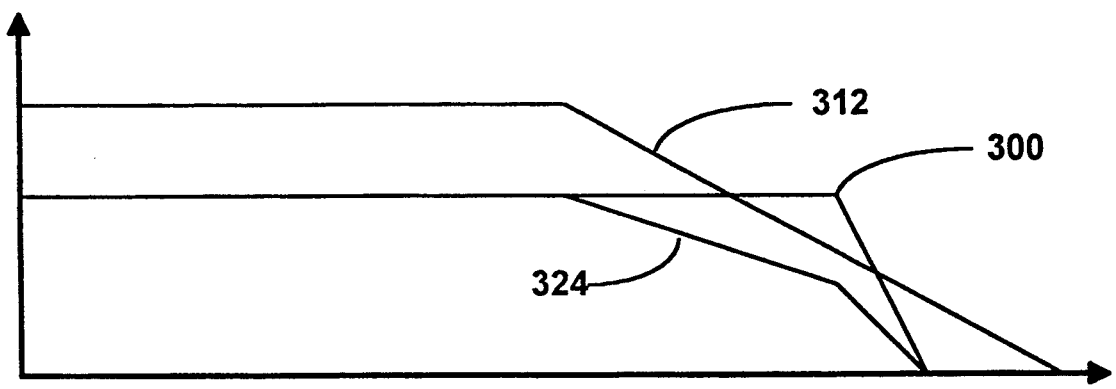
FIG. 4B illustrates, in a graph, the amplitude versus frequency spectrum of an output analog filter with improved frequency response.
Figure 4C:
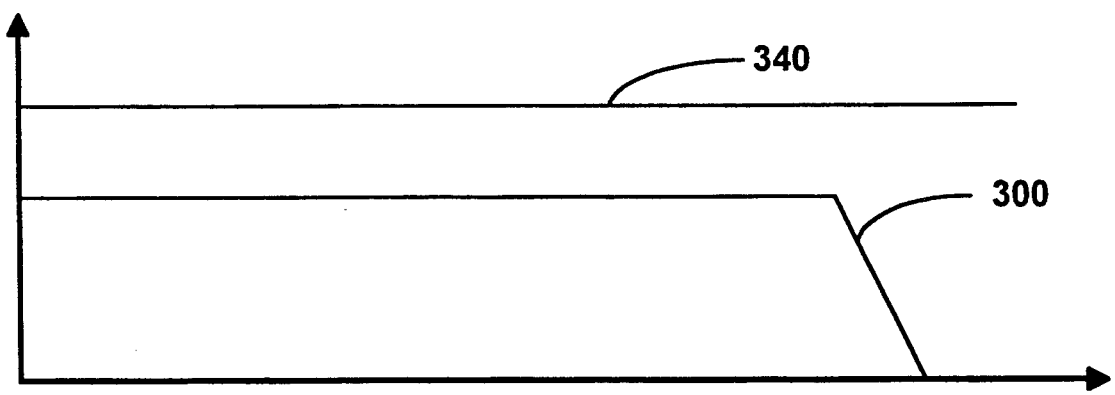
FIG. 4C illustrates, in a graph, the amplitude versus frequency spectrum of an oversampling digital-to-analog converter with improved noise suppression.

FIGS. 4A, 4B and 4C illustrate the output spectrum of a compact disc player according to the invention. The audio frequency spectrum 300, extending from 0 to 20 kHz, is shown in each of these figures. FIG. 4A shows the frequency response 330 of the amplitude and phase preprocessor 208. It raises the frequency response of the upper portion of the audio frequency spectrum. The resulting output audio spectrum 332 of the amplitude and phase preprocessor 208 has a peak in the upper audio band. The frequency response 312 of the narrow low pass filter 214 rolls off the audio spectrum 300 as shown in FIG. 4B. The corner frequencies of the frequency response 330 and 312 are the same and the frequency response 330 of the amplitude and phase preprocessor 208 approximates the inverse of the analog output filter 214. The combined frequency response 340 of the amplitude and phase preprocessor 208 and the narrow analog low pass filter 214 is therefore flat resulting in an output audio spectrum which is also flat with no frequency deviation. Any undesired digital noise or interference immediately above 20 kHz will be significantly attenuated by the narrow analog low pass filter 214.

OPERATION—FIGS. 1 to 6

In the typical embodiment of the present invention illustrated in FIG. 1B, a compact disc player 202 is used as an example. The compact disc drive accepts compact disc which contain digital data representing the digital samples of the stereo audio program stored on the disc. When the compact disc is played it extracts the digital data and converts it to a serial data stream which is passed to the digital interpolating filter 206, which typically increases the sampling rate 8 times from 44.1 kHz to 352.8 kHz. The amplitude and phase corrector 208 converts the serial data stream from the digital interpolator 206 to parallel data for further processing. The digital amplitude and phase preprocessor 208 shown in FIG. 2 is designed to work with a single pole analog output filter 214. Implementations for higher order filters can be designed in a similar manner to the design of the digital amplitude and phase preprocessor 208 shown in FIG. 2. In FIG. 2 the serial to parallel converter 220 holds the present output sample, while the output of register 1, denoted 222, holds the previous output sample and the output of register 2, denoted 224, holds the sample received two samples previously. We will denote the present sample $x_i(t)$. The output of register 1, denoted 222, is $x_i(t-t_s)$ and the output of register 2, denoted 224, is $x_i(t-2t_s)$, where $t_s$ is the sampling period of the digital samples. The subtractor 230 subtracts the output samples of the serial to parallel converter 220 from the output samples of register 2, denoted 224. The multiplier 226 multiplies the output samples from register 1, denoted 222, by a constant $1/K$. The adder 232 adds the output from the subtractor 230 to the output from the multiplier 226. The output of the adder contain the preprocessed digital audio samples which are fed to the parallel to serial converter 234, for subsequent conversion from parallel to serial format.

The subtractor 230 takes the difference $x_s(t)$:

$$x_s(t) = x_i(t) - x_i(t-2t_s):  \qquad (1)$$

If the sampling rate is much higher than the bandwidth of the audio spectrum (20 kHz), then $$x_i(t) - x_i(t-2t_s) \approx 2t_s \times d/dt(x_i(t-t_s)). \qquad (2)$$

Hence, in the present case, where the sampling rate is 352.8 kHz, approximately 18 times higher than the audio bandwidth, the output $x_s(t)$ of the subtractor 232 closely approximates:

$$x_s(t) \approx 2t_s \times d/dt(x_i(t-t_s)) \qquad (3)$$

The output $x_o(t)$ of the adder 232 is therefore $$x_o(t) = x_s(t) + (1/K) \times x_i(t-t_s) \approx [(1/K) + 2t_s \times d/dt]x_i(t-t_s) \qquad (4)$$

The delay of one sampling period $t_s$ represented in equation (4) has no effect on the frequency response.

Taking the Laplace transform of (4) gives the frequency response 330 of the amplitude and phase preprocessor 208:

$$X_o(s) \approx [(1/K) + 2t_s s]X_i(s) = (1/K) \times (1 + 2Kt_s s)X_i(s) \qquad (5)$$

The frequency response $X_L(s)$ of a single pole lowpass filter is $$X_L(s) = 1/[1 + s/(2\pi f_0)]$$

where $f_0$ is the 3 dB bandwidth of the filter. Hence the combined frequency response $Y_o(s)$ of the preprocessor 208 and the low pass filter 214 is $$Y_o(s) = X_L(s) \times X_o(s) \approx (1/K) \times (1 + 2Kt_s s) \times X_i(s) / [1 + s/(2\pi f_0)] \qquad (6)$$

If $$2Kt_s = 1/(2\pi f_0) \qquad (7)$$

then $$Y_o(s) = (1/K) \times X_i(s) \qquad (8)$$

In other words, if K is selected such that $$K = 1/(4t_s \pi f_0), \qquad (9)$$

then the combined frequency response, of the amplitude and phase preprocessor 208 and the low pass filter 214, is flat with negligible frequency or phase deviation over the audio band. It is desirable to select the bandwidth $f_0$ such that K becomes an integral power of two, because then the multiplication by $1/K$ simply consists of shifting the digital samples by a fixed amount equal to $\log_2(K)$. This simplifies the implementation of the preprocessor, since no multiplier is needed.

Extension to higher order filters is achieved by extending the present example. For instance a second order response can be achieved by cascading two sections of low pass filters and two matching sections of preprocessors.

SUMMARY, RAMIFICATIONS, AND SCOPE

In this invention digitized sound is stored on a storage medium such as a compact disc or a digital audio tape. The digital sound samples are converted to analog sound by a DAC and then filtered by a low pass filter in order to remove unwanted frequency components. These low pass filters can change the sound quality by distorting the phase and frequency response of the reproduced sound. In present art CD and DAT players, the 3 dB bandwidth of these filters are set at a high frequency, often many times the audio bandwidth, to minimize the phase and amplitude deviations. These filters adequately suppress aliased frequency components around the sampling frequency, assuming eight times over sampling, but do not suppress any unwanted digital noise with frequency components close to the audio band.

Digital noise and interference typically contain discrete frequency components. It is well known in the art, that when such spurious components are passed through non-linear circuits and devices, sum and difference frequency components are generated which may fall in the audio band even if the input signals are outside the audio band. As an example, such audible spurious components can be generated by distortion in amplifiers, speakers and headphones.

In the invention a low pass filter, with a bandwidth comparable to the audio bandwidth, is used to filter the output of the DAC. A digital preprocessor, with an amplitude and phase response which is complementary to the output lowpass filter, processes the digital audio samples before they are applied to the DAC. The analog and digital processing is designed such that the combined frequency response is uniformly flat over the entire audio band. The result is a system where unwanted spurious components above the audible range (20 kHz) are suppressed, while no significant phase or amplitude distortion is imposed on the desired audio signal.

We claim:

1. An apparatus for digital audio reproduction comprising:

a digital interpolating filter means for increasing the sampling rate of a serial digital signal;

an amplitude and phase preprocessing means for preprocessing said serial digital signals received from said digital interpolating filter means;

a digital-to-analog converter means for converting said preprocessed serial digital signals to analog signals; and a low-pass filter means for filtering said analog signals; wherein said amplitude and phase preprocessor means has a frequency response substantially the inverse of said low-pass filter over the audio frequency bandwidth, further comprises:

a serial-to-parallel converter means for converting said serial digital signal to a first parallel digital signal;

a first register means including for delaying said first parallel digital signal from said serial-to-parallel converter means for one sampling period;

a second register means including for delaying said first parallel digital signal from said first register means for one sampling period;

a subtractor means for subtracting said first parallel digital signal from said second register from a second parallel digital signal from said serial-to-parallel converter means;

a multiplier means for multiplying a second parallel digital signal from said first register means by a constant 1/K;

an adder means for summing said parallel digital signal from said multiplier and said parallel digital signal from said subtractor means; and a parallel-to-serial converter means for converting said parallel digital signal from said adder means to a serial digital signal.

2. The apparatus of claim 1, wherein said constant 1/K is an integral power of two.

* * * * *